*(12)* United States Patent
Frich (10) Patent No.: US 9,243,607 B2
(45) Date of Patent: Jan. 26, 2016

(54) WAVE RESPONSIVE ELECTRICAL GENERATOR

(71) Applicant: Mark R. Frich, St. Augustine, FL (US)

(72) Inventor: Mark R. Frich, St. Augustine, FL (US)

( * ) Notice: Subject to any disclaimer, the term of this patent is extended or adjusted under 35 U.S.C. 154(b) by 0 days.

(21) Appl. No.: 14/605,441

(22) Filed: Jan. 26, 2015

(65) Prior Publication Data

US 2015/0159623 A1    Jun. 11, 2015

Related U.S. Application Data

(63) Continuation-in-part of application No. 13/539,885, filed on Jul. 2, 2012, now Pat. No. 8,938,957, which is a continuation-in-part of application No. 13/336,781, filed on Dec. 23, 2011, now Pat. No. 8,209,973.

(60) Provisional application No. 61/542,455, filed on Oct. 3, 2011.

(51) Int. Cl.
*F03B 13/18*      (2006.01)
*F16D 31/02*      (2006.01)

(52) U.S. Cl.
CPC ........... *F03B 13/1865* (2013.01); *F03B 13/187* (2013.01); *F03B 13/1845* (2013.01); *F16D 31/02* (2013.01); *F05B 2260/421* (2013.01); *F05D 2260/406* (2013.01); *F05D 2260/4021* (2013.01); *F05D 2260/56* (2013.01); *Y02E 10/38* (2013.01)

(58) Field of Classification Search
CPC .. F03B 13/1845; F03B 13/1865; Y02E 10/38
USPC ........................................ 60/398; 290/42, 53
See application file for complete search history.

(56) References Cited

U.S. PATENT DOCUMENTS

| | | | |
|---|---|---|---|
| 8,209,973 B1 * | 7/2012 | Frich .................... | F03B 13/1845 60/398 |
| 8,938,957 B2 * | 1/2015 | Frich .................... | F03B 13/1845 60/398 |

* cited by examiner

*Primary Examiner* — Michael Leslie
(74) *Attorney, Agent, or Firm* — Thomas C. Saitta (57) ABSTRACT

A wave responsive electrical generator device having a buoyant member connected to an anchor by a tether line member, the line member passing through a sheave mounted within the buoyant member and descending to a counterweight, whereby vertical motion of the buoyant member results in rotation of the sheave, which in turn operates an alternator to produce electricity, wherein the line member is a plurality of belts mechanically interlocking with the sheave.

19 Claims, 10 Drawing Sheets

SCHEMATIC OF HYDRAULIC SYSTEM

WAVE RESPONSIVE ELECTRICAL GENERATOR

This application is a continuation-in-part application of U.S. patent application Ser. No. 13/539,885, filed Sep. 2, 2012, now allowed, which was a continuation-in-part application of U.S. patent application Ser. No. 13/336,781, filed Dec. 23, 2011, now U.S. Pat. No. 8,209,973, issued Jul. 3, 2012, which claimed the benefit of U.S. Provisional Patent Application Ser. No. 61/542,455, filed Oct. 3, 2011, the disclosures of which are incorporated herein by reference.

BACKGROUND OF THE INVENTION

This invention relates generally to the field of wave responsive electrical generators, and more particularly relates to offshore generators comprising buoyant members that harness energy from waves and swells occurring in large bodies of water, particularly the ocean.

Tides, currents, wind and other weather events impart energy to large bodies of water that result in surface swells and waves. A buoyant object will rise and fall with these waves and swells. There have been many attempts to utilize the energy of the waves and swells to generate electricity, typically by harnessing the vertical reciprocal motion of the buoyant object to operate an electrical generator.

It is an object of this invention to provide a wave and swell responsive electrical generator distinct from the previous systems, the wave and swell responsive electrical generator assembly comprising an anchored buoyant member, the buoyant member being connected to the anchor member by a tether line, such as a cable, chain or belt, passing through a sheave positioned in the buoyant member, the tether line then descending to a counterweight, whereby vertical motion of the buoyant member in either direction results in rotation of the sheave and movement of hydraulic cylinders to drive an hydraulic motor that drives an electrical generator or rotation of a primary and secondary transmission to drive an alternator.

It is another object to provide a wave and swell responsive electrical generator comprising an anchored buoyant member, the buoyant member being connected to the anchor member by a tether line, such as a cable, chain or belt, passing through a sheave positioned in the buoyant member, the tether line then descending to a counterweight, whereby vertical motion of the buoyant member in either direction results in rotation of the sheave and rotation of at least one transmission that drives and alternator.

SUMMARY OF THE INVENTION

In a basic sense, the wave responsive electrical generator comprises a buoyant member connected to an anchor by a tether line member, the line member passing through a sheave mounted within the buoyant member and descending to a suspended counterweight, whereby vertical motion of the buoyant member results in rotation of the sheave, which in turn operates hydraulic cylinders to deliver hydraulic fluid under pressure to an hydraulic motor, which drives an electrical generator, or alternatively rotates a primary and secondary transmission to drive an alternator. Gas pressurized hydraulic accumulator tanks are provided in line between the hydraulic cylinders and the hydraulic cylinder such that the hydraulic fluid is provided to the hydraulic motor at a steady flow rate. With this structure, power is extracted during both the rising and falling of the buoyant member. Preferably, the buoyant member comprises a flotation housing with an upper body and a lower body, the upper body being generally disk-shaped and the lower body being generally cylindrical, the diameter of the upper body being significantly greater than the diameter of the lower body. The line member may comprise a cable, chain, wire, belt, ridged belt or like member, and the counterweight is provided with a line encircling assembly, such that the counterweight moves up and down the portion of the line member extending from the anchor to the buoyant member.

DETAILED DESCRIPTION OF THE INVENTION

With reference to the drawings, the wave responsive electrical generator will be described with regard for the best mode and preferred embodiments. The term "wave" shall be used hereinafter to refer to a wave, swell or other recurring, periodic or non-periodic, rising and falling of the surface of the water in which the wave responsive electrical generator is utilized.

In a general sense, the wave responsive electrical generator device or assembly comprises a buoyant member connected to an anchor by a tether line member, the line member passing through a sheave mounted within the buoyant member and descending to a suspended counterweight, whereby vertical motion of the buoyant member results in rotation of the sheave, which in turn operates hydraulic cylinders to deliver hydraulic fluid under pressure to an hydraulic motor, which drives an electrical generator, or alternatively rotates a primary and secondary transmission to drive an alternator. With this structure, power is extracted during both the rising and falling of the buoyant member. Preferably, the buoyant member comprises a flotation housing with an upper body and a lower body, the upper body being generally disk-shaped and the lower body being generally cylindrical, the diameter of the upper body being significantly greater than the diameter of the lower body. The line member may comprise a cable, chain, wire, belt, ridged belt or like member, or multiples or combinations thereof, and the term "line" shall be taken herein to refer to any such member. The counterweight is provided with a line encircling assembly, such that the counterweight moves up and down the portion of the line member extending from the anchor to the buoyant member in response to up and down movement of the buoyant member.

The buoyant member 10 is a structure designed and constructed so as to float at or on the surface of water, such as in an ocean. The buoyant member 10 comprises a flotation housing 11 forming a shell or body that provides an internal cavity 12 to receive some of the operational, electrical and other components of the wave responsive electrical generator. The buoyant member 10 is provided with a bottom opening 13, a waterproof waterbox housing 16 being mounted at the bottom opening 13, the waterbox housing 16 being disposed internally within the flotation housing 11, such that the waterbox housing 16 ingress of water into the portions of the internal cavity 12 of the flotation housing 11 that contains some of the operational, electrical and other components of the electrical generating system.

The shape and configuration of the buoyant member 10 may vary, but preferred embodiments will have a shape that is symmetrical and generally circular in lateral cross-section, such as a sphere, cylinder or dome. In a more preferred embodiment, the flotation housing 10 of the buoyant member 10 has an upper body 14 and a lower body 15. The upper body 14 is generally disk-shaped with a diameter significantly greater than its height, while the lower body 15 is generally cylindrical, such that the upper body 14 may be considered an annular flange extending from the upper portion of the lower body 15. The width or diameter of the lower body 15 is significantly smaller than largest width of diameter of the upper body 14, with a ratio of approximately 1:2.5 being suitable. With this configuration, the buoyant member 10 is indifferent to wave and wind direction, is highly stable in rough conditions where wave capping or significantly large waves are encountered, and is able to react strongly to rising waves in a controlled manner. In relatively calm water, the lower body 14 of the buoyant member 10 will be completely or almost completely submerged while the upper body 15 resides at or above the water surface. When encountering small or gentle waves the upper body 15 may remain above the water, but when large, violent or rapid waves are encountered, the upper body 15 will initially submerge, thereby presenting a much greater surface area to the wave energy, resulting in powerful vertical movement of the buoyant member 10 upward along line member 17.

Figure 1:
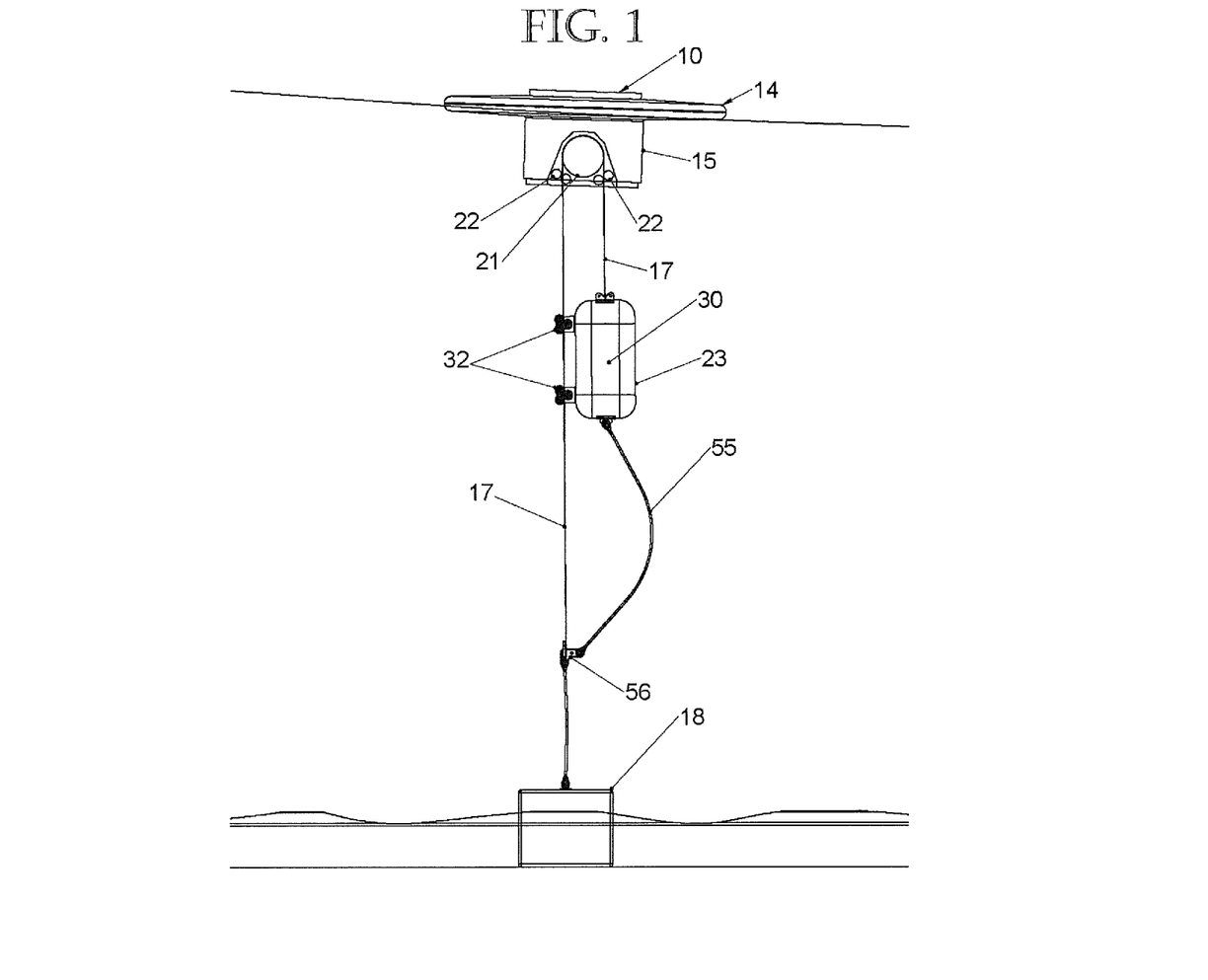
FIG. 1 shows the buoyant member, counterweight member, anchor member and line member of the wave responsive electrical generator as deployed in a body of water.
Figure 2:
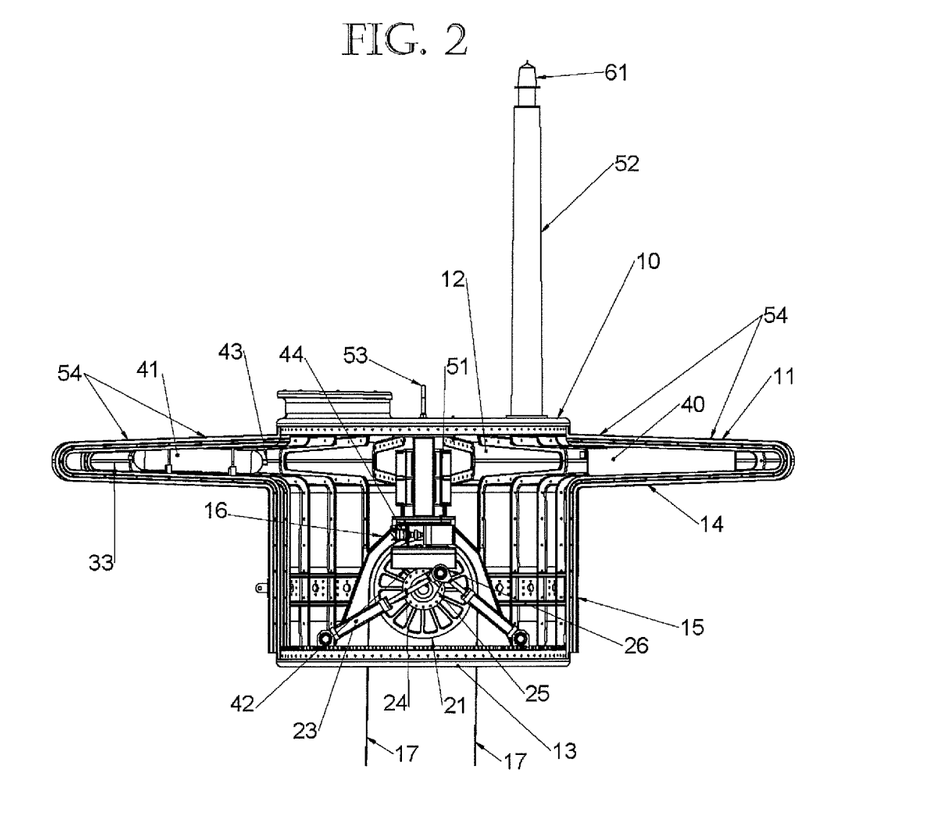
FIG. 2 is a cross-sectional, exposed side view of the buoyant member.
Figure 3:
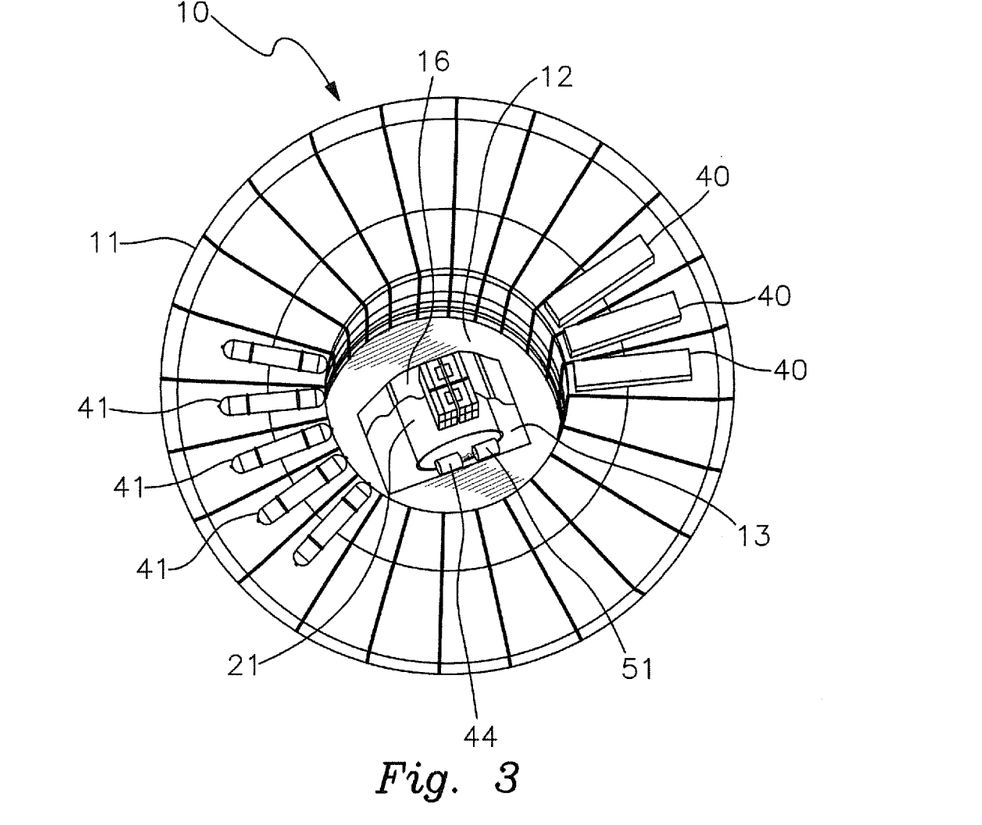
FIG. 3 is an exposed top view of the buoyant member.
Figure 4:
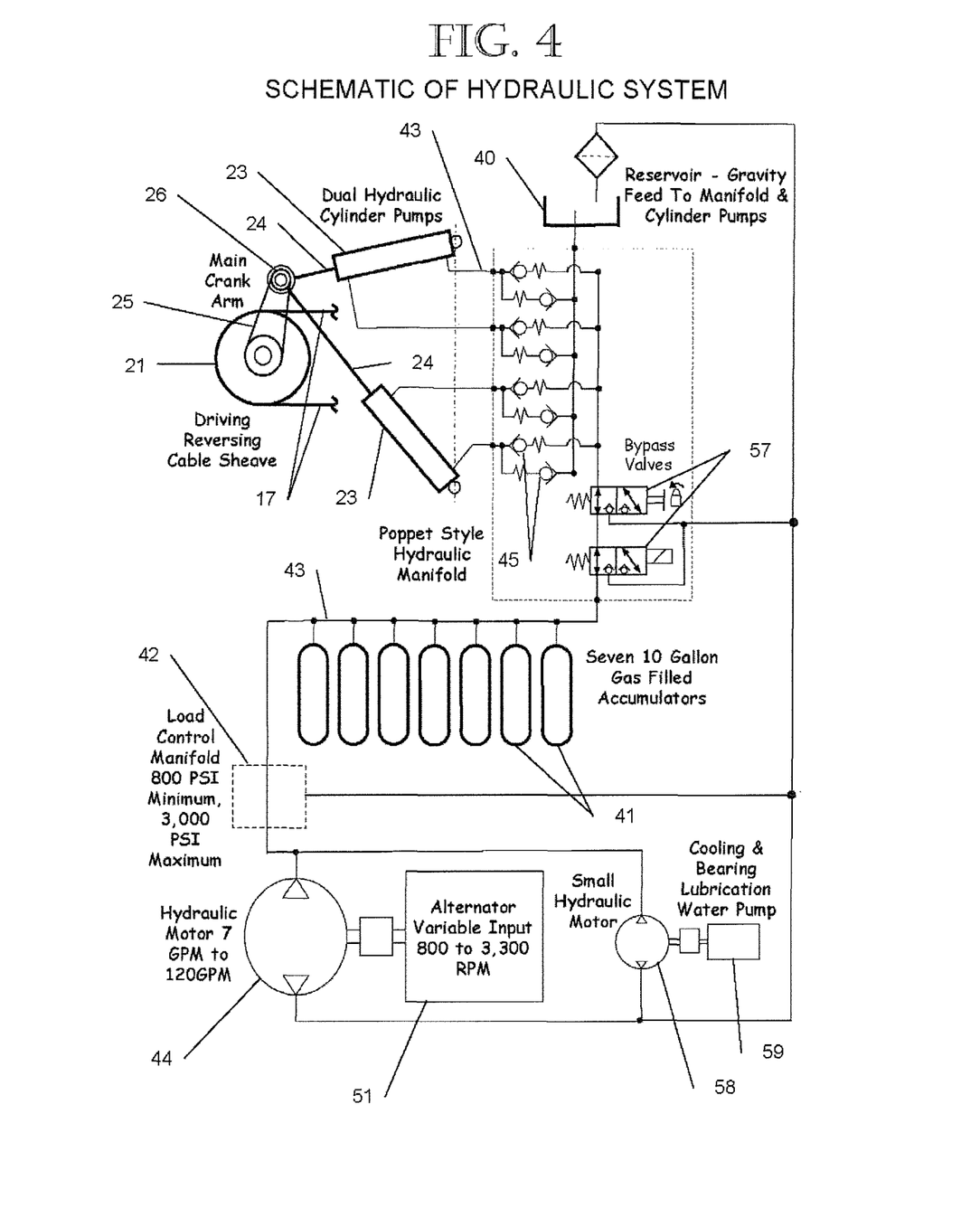
FIG. 4 is a schematic showing a representative hydraulic system.
Figure 5:
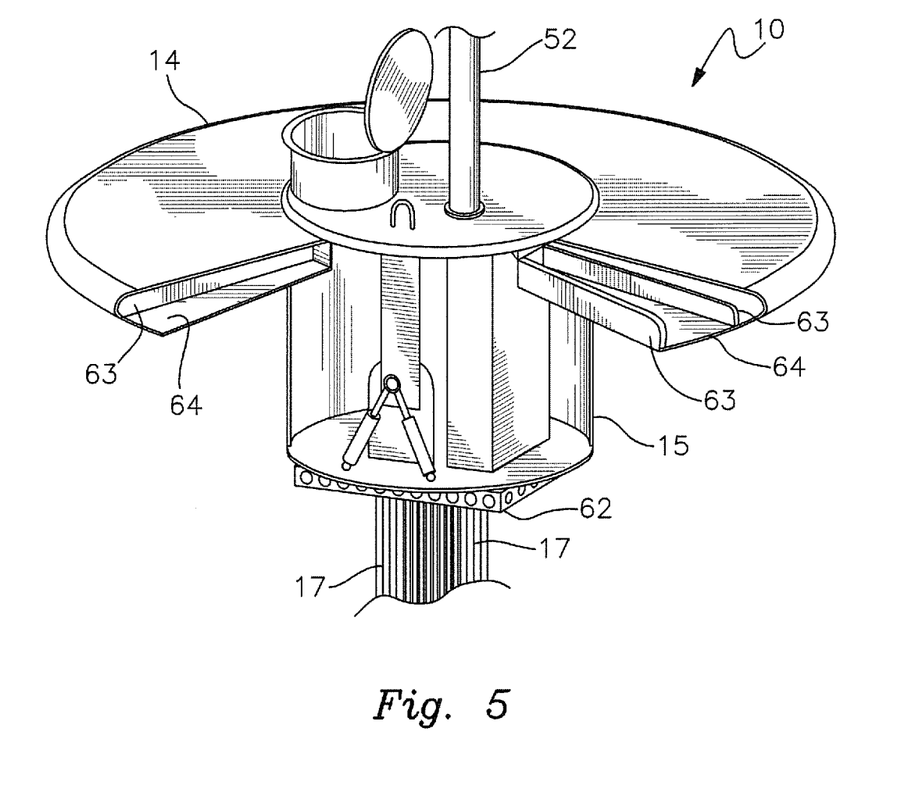
FIG. 5 is a partially exposed view of an embodiment of the buoyant member showing the reinforcing members and the angled lower peripheral edge of the upper body.
Figure 6:
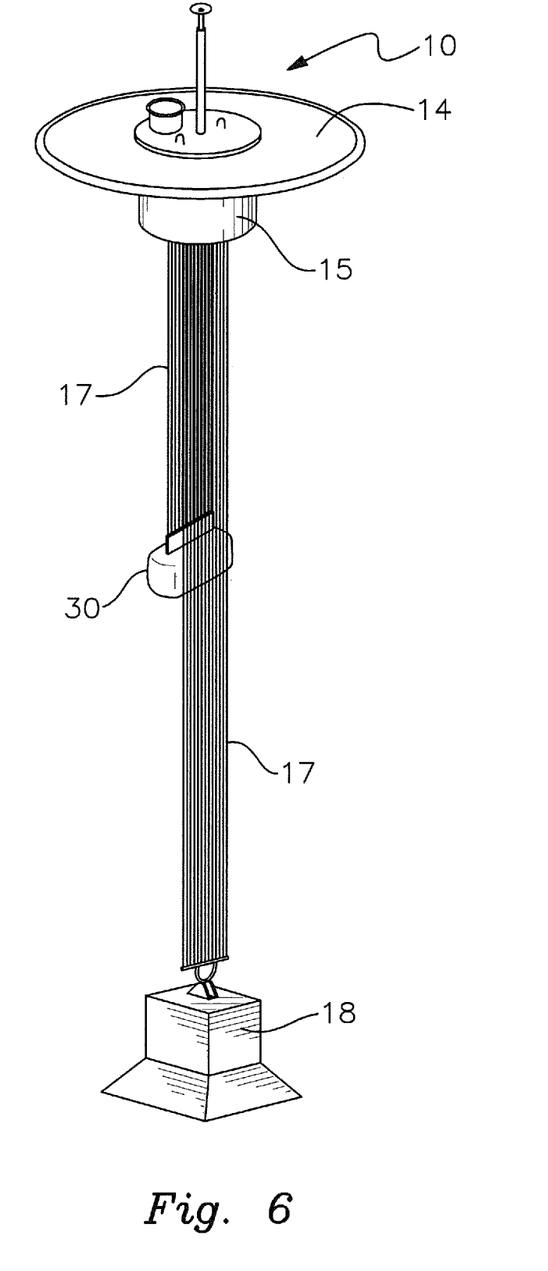
FIG. 6 is a full view of the embodiment of FIG. 5 showing a multiple belt line member.

In a preferred embodiment as shown in FIG. 5, the lower body 15 comprises a cylindrical member and the upper body 14 is a wider disk-shaped member extending outwardly from the cylindrical upper body 14 and having radially extending internal reinforcing members 63, such as braces or girders, the upper body 14 being joined to the cylindrical lower body 15. This design provides increased structural integrity. The lower peripheral rim or edge 64 of the upper body 14 is angled or cornered, such as for example by providing rim 64 with a 90 degree angle while the upper peripheral portion of the upper body 14 is rounded, as this design provides for improved hydrodynamics in wave action.

The buoyant member 10 is tethered to the floor of the ocean by a line member 17 extending from an anchor member 18 disposed on the floor The line member 17 may comprise a cable, wire, belt, line, toothed or ridged belt, or multiples or combinations of such, or similar members of suitable strength and material composition. The line member 17 must possess durability in the water environment and must be capable of providing sufficient traction or friction when combined with the main drive sheave 21. The preferred embodiment of the line member 17 comprises a toothed or ridged belt, such that mechanical interlocking with a correspondingly toothed or ridged main drive sheave 21 is provided. The line member 17 extends from the anchor member 18 to the buoyant member 10, passing through the bottom opening 13 and into the interior of the waterbox housing 16. The line member 17 passes over a main drive sheave 21 and continues downward to be connected to a suspended counterweight or drive member 30, the counterweight member 20 being suspended sufficient distance above the ocean floor such that it will not contact the floor when the buoyant member 10 is at its shortest distance above the floor. A plurality of guide or idler sheaves 22 may be positioned within the waterbox housing 16 to better control the line member 17 during vertical movement of the buoyant member 10.

The counterweight 30 is provided with a means for securing or slidingly mounting the counterweight member 30 along the portion of the line member 17 extending between the anchor member 18 and the buoyant member 10, such as a line encircling assembly 31, whereby the counterweight member 30 is attached to the line member 17 in a manner that allows the counterweight member 30 to move up and down along the line member 17 extending between the anchor member 18 and the buoyant member 10. The line encircling assembly 31 may comprise, for example, a vertical bore or a plurality of guide pulleys 32 that receive the line member 30 therethrough in order to maintain attachment of the counterweight member 30 to the line member 17 without restricting vertical movement of the counterweight member 30. The counterweight member 30 may be provided with a rudder member 33, or may be structured to have a similar outer shape, whereby the counterweight member 30 will orient itself in the direction of any current present in the environment.

Figure 9:
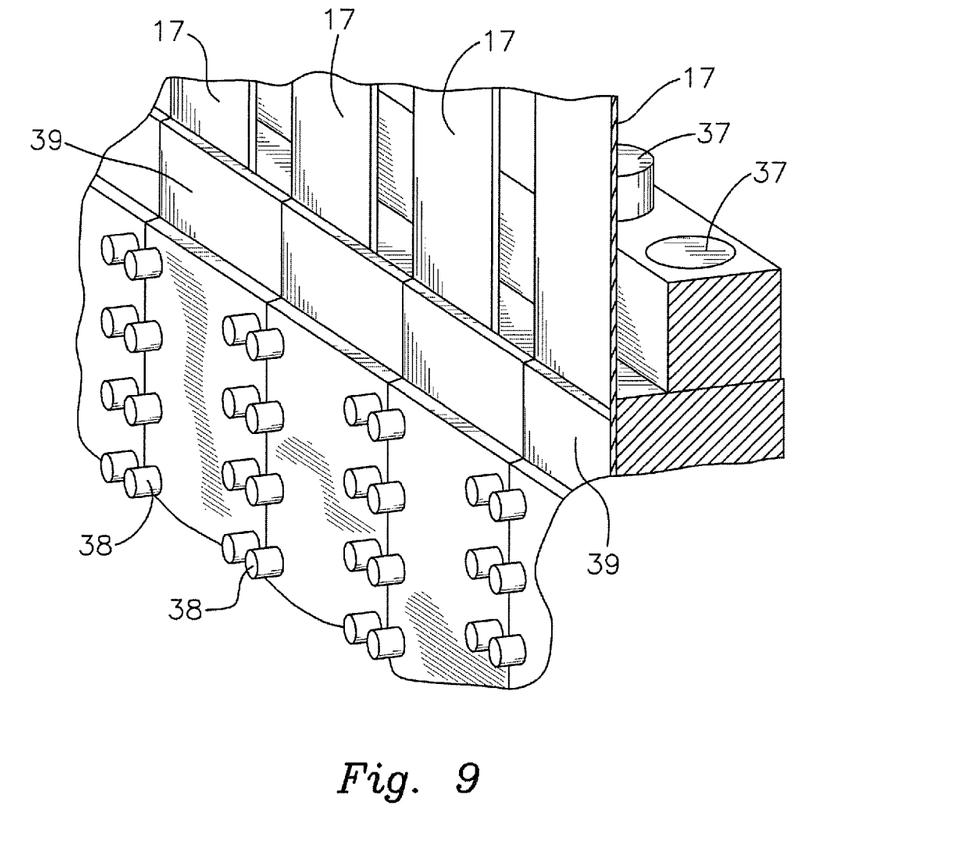
FIG. 9 is a partially exposed view of the belt adjustment mechanism of the embodiment of FIG. 6.

A preferred embodiment of the invention is shown in FIGS. 5 through 9. In the marine environment, traction between the line member 17 and the drive sheave 21 may be impaired by algae, slime, or other factors. Therefore, a preferred embodiment for the line member 17 comprises a plurality of parallel belt members, the belt members being transversely ridged and/or grooved, with the main drive sheave 21 comprising a plurality of sheaves, either separate sheaves connected so as to operate as a singe sheave or multiple sheaves formed as single body, that comprise teeth, ridges or groove members 27 in corresponding configuration such that the ridged belts 17 and the drive sheaves 21 mate or mechanically interlock such that slippage is precluded. The line encircling assembly 31 of the counterweight 30 may comprise a channeled guide rack 34 that allows vertical relative movement between the belts 17 and the counterweight 30 while restricting independent lateral movement, the channeled guide rack 34 maintaining the belts 17 in side-by-side and parallel alignment. The belts 17 may be connected to the counterweight by a belt adjustment mechanism 35 such that the individual belts 17 can be adjusted, i.e., shortened or lengthened as required. As shown in FIG. 9, a representative embodiment of the belt adjustment mechanism 35 may comprise a mounting block 36 connected to the counterweight 30. The belts 17 are provided with grooved end plates 39 that are inserted into the mounting block 36. Length adjusting bolts 37 are located within threaded bores of the mounting block 36 and abut the end plates 39, such that rotation of the adjusting bolts 37 causes the end plates 39 to be extended or retracted relative to the mounting block 36. Retention bolts 38 extend through the mounting block 36 and into the grooves of the end plates 39, locking the end plates 39 and the belts 17 in a fixed position relative to the mounting block 36 once the proper belt length is achieved.

The counterweight member 30 keeps the line member 17 taut and in secure contact with the main drive sheave 21 as the counterweight slides up and down on the line member 17. As the buoyant member 10 rises on a wave, the counterweight member 30 is pulled upward due to the increased distance between the anchor member 18 and the buoyant member 10. As the buoyant member 10 descends, the counterweight member 30 likewise descends due to the decreased distance between the anchor member 18 and the buoyant member 10.

The main drive sheave 21 is mounted on a wall of the waterbox housing 16 and can rotate in either direction in response to movement of the line member 17 as the buoyant member 10 rises or falls. The main drive sheave 21 may comprise for example an annularly grooved wheel for use with a line member 17 comprising a cable, line or belt, wherein friction between the line member 17 and the main drive sheave 21 results in rotation of the main drive sheave 21 when the line member 17 moves, or may comprise, preferably for example, a toothed or ridged gear or pulley for use with a line member 17 comprising a chain, toothed or ridged belt, temporary mechanical interlocking between the line member 17 and the main drive sheave 21 resulting in rotation of the main drive sheave 21 when the line member 17 moves.

Rotational movement of the main drive sheave 21 is translated into reciprocal linear movement of at least two hydraulic cylinders 23. As shown, the pistons 24 of the hydraulic cylinders 23 may be connected to a sheave crank arm 25 mounted onto the main drive sheave 21 by a rotating connection assembly 26, such a for example a bearing assembly. Rotational movement of the main drive sheave 21 results in either extension or retraction of the pistons 24, and the pistons 24 will be driven both when the buoyant member 10 rises to produce rotation of the main drive sheave 21 in one direction and when the buoyant member descends to produce rotation in the other direction. The hydraulic cylinders 24 deliver hydraulic fluid from a reservoir 40 through a plurality of gas pressurized hydraulic fluid accumulator tanks 41 to an hydraulic motor 44, hydraulic fluid conduits 43, check valves 45 and a load control manifold 42 being provided to control and direct the flow of hydraulic fluid to the hydraulic motor 44 and back into the hydraulic fluid reservoir 40. The accumulator tanks 41 may comprise, for example, tanks having gas-filled bladders which are compressed by hydraulic fluid forced into the tanks 41, such that the bladders are used to expel the hydraulic fluid when desired. The load control manifold 42 may be of any suitable type, and may utilize servo valves or simple on/off valves. The accumulator tanks 41 and load control manifold 42 insure that the hydraulic fluid is delivered to the hydraulic motor 44 in a steady manner, since fluid flow from the hydraulic cylinders 23 will be intermittent and pulsing, will vary in the amount of force being delivered. Reserve pressure in the accumulator tanks 41 is utilized to deliver hydraulic fluid to the hydraulic motor 44 at times when there is insufficient vertical movement of the buoyant member 10 to provide sufficient pressure from the action of the hydraulic cylinders 23 alone. The hydraulic motor 44 drives an electrical generator 51 to create electricity which is delivered through electrical conduits (not shown) to a shore line grid system. When multiple wave responsive electrical generators are provided in a grouping, the electricity may first be delivered to a power synchronizing system.

Vertical movement of the buoyant member 10 that creates excess fluid flow from the hydraulic cylinders 23 beyond the amount necessary to operate the hydraulic motor 44 is utilized to refill and re-pressurize the accumulator tanks 41. The accumulator tanks 41 are provided with pressure release valves to cycle hydraulic fluid back to the hydraulic fluid reservoir 40 as needed. Furthermore, the hydraulic system may further comprise controlled or automatic bypass valves 57 to route hydraulic fluid from the hydraulic cylinders 23 directly back to the hydraulic fluid reservoir 40 if necessary.

A secondary hydraulic motor 58 of lesser power may be provided to operate cooling and bearing lubrication pumps 59.

Visible markers 61, radio transmitting equipment 52 or lifting connectors 53 may be provided on the upper side of the buoyant member. Additionally, the solar panels 54 may be positioned atop the buoyant members 10 to supplement electrical production. Various shock absorbing devices may be provided on the line member 17 or the counterweight member 30 to preclude damage during extreme wave action. Safety cables 55, float or diver connection members 56 and the like may be provided on the line member 17 and counterweight member 30 for use when installing, repairing or removing the wave responsive electrical generator. Preferably, the diver connection member 56 is positioned no lower than 100 feet from the water surface.

It may be necessary to lower the internal temperature of the buoyant member 10, in which case a cooling system comprising a heat exchanger 61, fans and similar known components may be utilized, the heat exchanger 61 being disposed on the underside of the buoyant member 10 so as to remain submerged in water.

Figure 7:
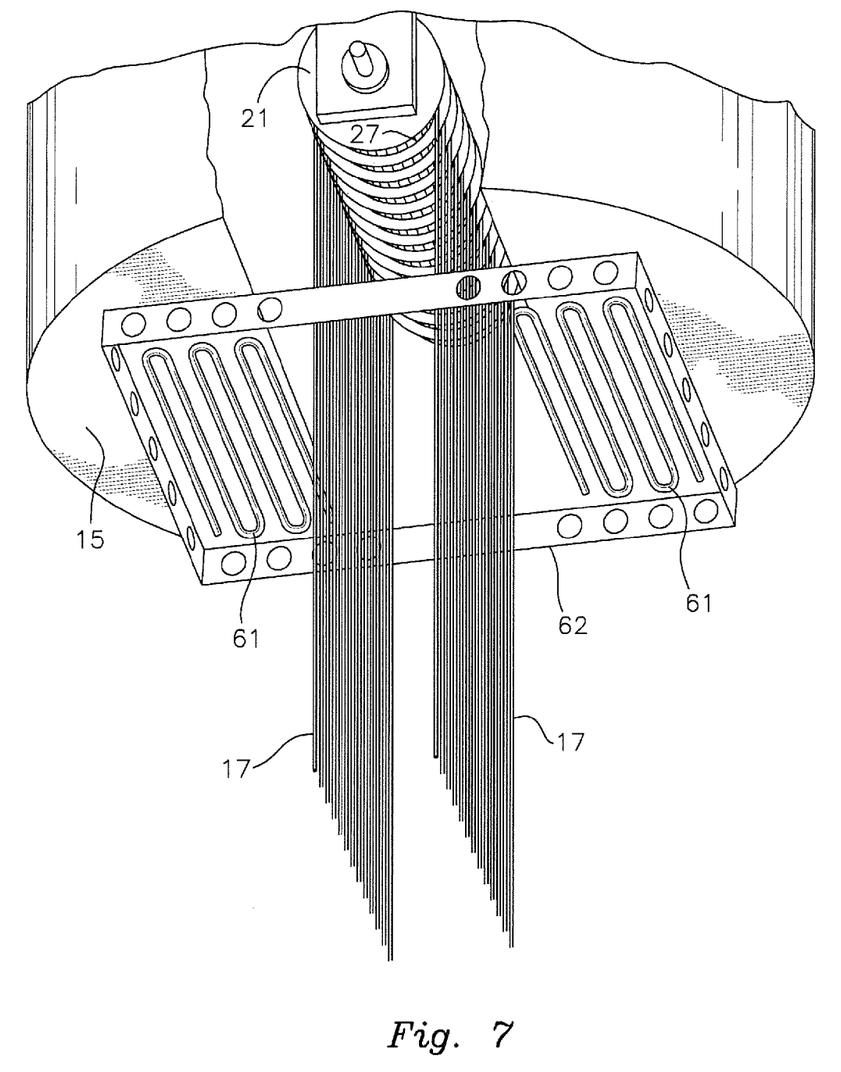
FIG. 7 is a partially exposed view showing the underside of the buoyant member of FIG. 6.
Figure 8:
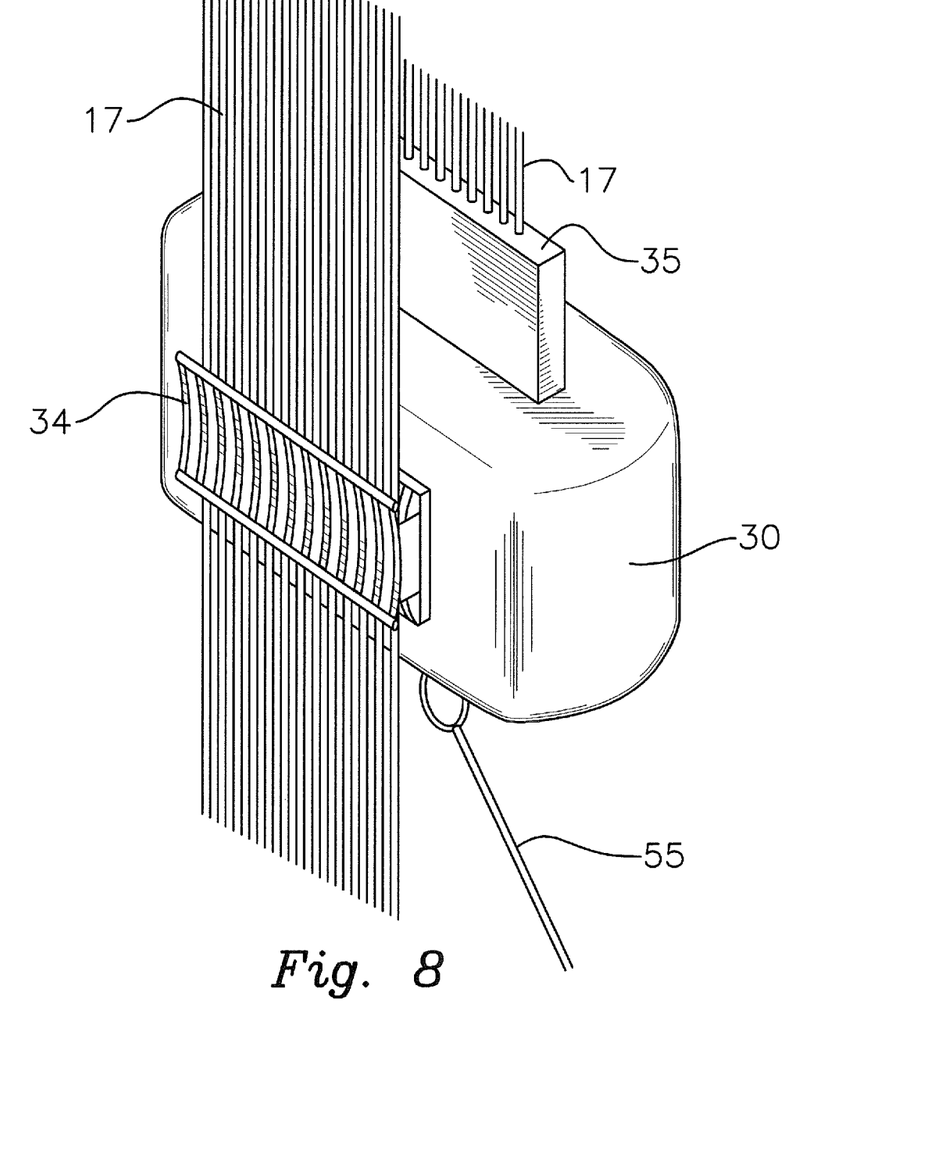
FIG. 8 is a view of the multiple belt line member and counter-weight member of the embodiment of FIG. 6.

It may also be necessary to restrict or impede the downward movement of the buoyant member 10 to prevent excessive slack in the line member 17, since the counterweight 30 may not be able to react as quickly buoyant member 10. A descent restrictor member 62, such as seen in FIG. 7, may be utilized, the restrictor member 62 comprising an apertured frame to impede movement of water up and around the lower body 15 of the buoyant member 10 as it descends. The cornered rim 64 of the upper body 14 also acts to retard downward motion of the buoyant member 10.

For purposes of providing a representative example, not meant to be limiting and with all dimensions and weights being approximates, the buoyant member 10 may have a height of eight feet, the upper body 14 having a height of 1.5 feet and the lower body having a height of 6.5 feet, with a maximum upper body 14 diameter of twenty four feet and a maximum lower body 15 diameter of ten feet. As described above, the buoyant member 10 containing its operational components may weigh 7500 pounds. The line member 17 may extend from fifty to hundreds of feet. An anchor member 18 of 80,000 pounds and a counterweight member 30 of 5300 pounds is suitable for use with a buoyant member 10 of the given size and weight. Obviously, the weight of the anchor member 18 and the counterweight member 30 will vary depending on the size and weight of the buoyant member 10.

In three offshore tests at different locations it has been found that wave heights averaged 3.4, 8.1 and 12.1 feet and wave periodicity averaged 5.13, 7.1 and 7.1 seconds, respectively. Using the first set of numbers, this means that the buoyant member 30 would have vertical movement totaling almost eight miles over a one year period. A single wave responsive electrical generator as described above and having a 10,000 pound counterweight member 30 could theoretically produce a horsepower of between 24 and 42 HP at the three sites.

Figure 10:
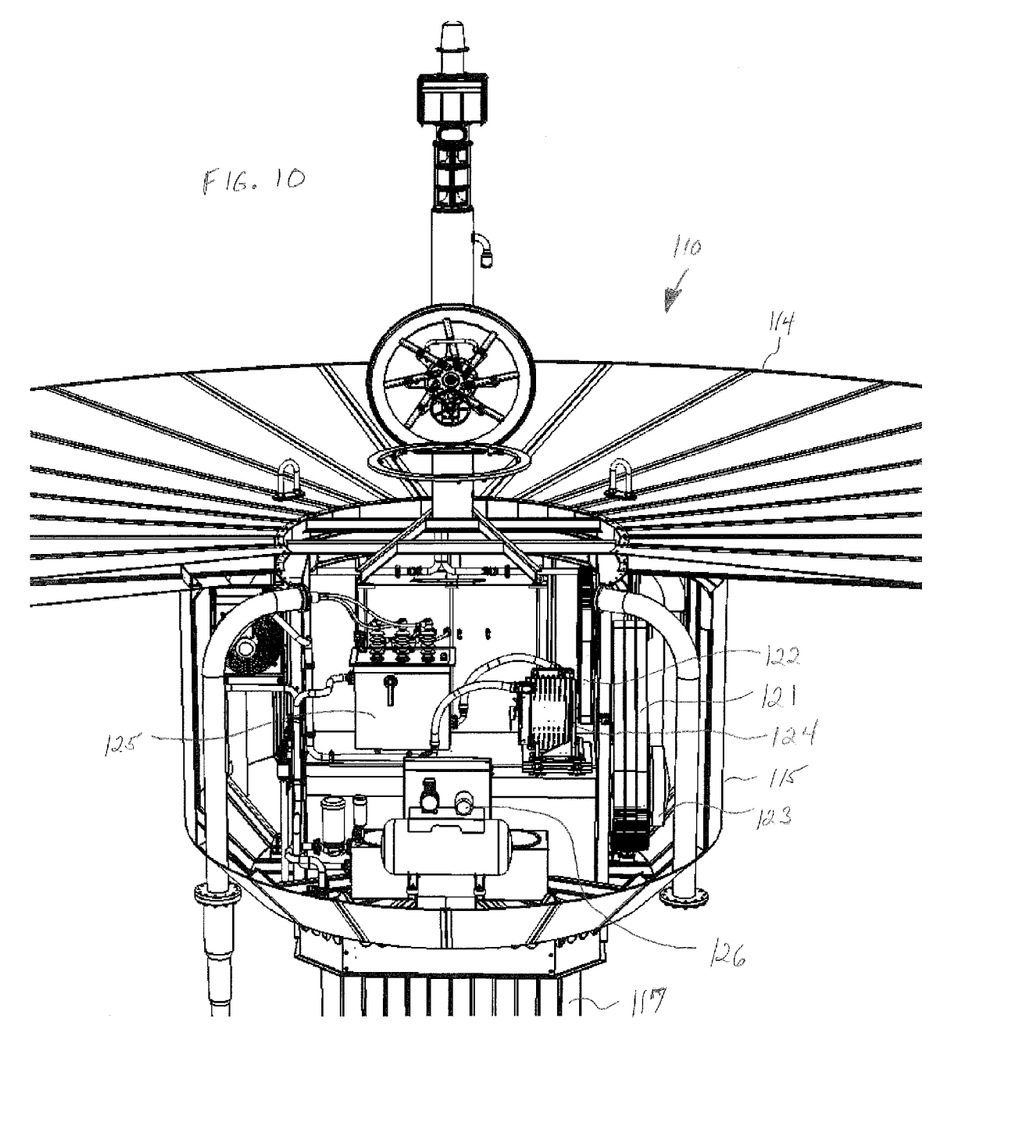
FIG. 10 is a view of an alternative embodiment of the invention utilizing transmission pulleys and an alternator.

An alternative embodiment of the invention, as illustrated in FIG. 10, which shows a buoyant member 110 comprised of an upper body 114 and a lower body 115, and is similar in structure to the above embodiments but in this embodiment electrical generation is produced by the action of line members 117, preferably in the form of belts, rotating a sheave as previously explained, the sheave turning a primary transmission system 121, shown as a pulley and belt assembly, which in turn rotates a secondary transmission assembly 122, shown as a pulley and belt assembly. The operation of the primary transmission assembly 121 is controlled by a clutch 123. The secondary transmission assembly 121 drives an alternator 124. The embodiment also includes an air compressor 126 and a transformer 125.

A representative example of suitable components comprises:

a. SwellGenie™—50' diameter floating vessel
    b. Anchor—200,000 pound concrete anchor on sea floor
    c. Drive Belts—12 timing belts with a total capacity of 1 million pounds
    d. Drive Weight—40,000 pound vertical sliding cast lead weight
    e. Anchor Belt Pulley—18" Diameter×7' long timing belt pulley
    f. Clutch—Main crank shaft air operated clutch
    g. Primary Transmission—7:1 timing belt induction transmission
    h. Secondary Transmission—7:1 timing belt induction transmission
    i. Alternator—180 kW rated synchronous AC current alternator Operation in the run mode is in response to a request from the Onshore Command and Control (OCC) center to produce power. Before the wave responsive electrical generator can start producing power the following conditions must be checked:

a. Temperature sensors must be within operating limits.
    b. Air pressure must be sufficient to activate the air clutch.
    c. Bilge pump limit switches must indicate that bilge water levels are acceptable.
    d. Ballast sensors must indicate that the device is at its most favorable attitude for producing optimal power based on the current ocean swell conditions.
    e. The main crank shaft encoder has had sufficient time to determine the optimal drive settings.

Once these conditions are favorable for Run Mode operation, the wave responsive electrical generator needs a non-deterministic command to run from the OCC center. The IPC then proceeds to engage the air clutch during a swell crest or swell trough position in the wave cycle when the main crank shaft is at or near zero RPM. This constant change in RPM range along with RPM reversing means that power generated by the alternator is a pulsing current. Voltage is a constant at 690 VAC while current fluctuates with RPM each time the device goes up a swell and then down a swell.

The alternator is always the opposing (resistive) force to the apparent gravitational force the drive weight exerts as it moves vertically up and down. The 40,000 pound drive weight exerts a 9" moment of force on the main crank shaft at all times. Thus the main crank shaft torque caused by the drive weight is constant at (40,000 pounds×0.75 feet=) 30,000 foot pounds. The primary and secondary induction ratios of 7:1 result in an alternator constant resistive force of [((30,000 foot pounds÷7)÷7)=]612 foot pounds.

When the alternator is applying its resistive force and extracting the 612 foot pounds of force to generate power, the wave responsive electrical generator has to compensate its buoyancy reactive load. Going up a swell the wave responsive electrical generator buoyant water line sinks 4" and gains 45,000 pounds of reactive buoyancy force. Going down a swell the wave responsive electrical generator buoyant water line raises 4" and losses 45,000 pounds of reactive force. The total buoyant loss due to resistive loads caused by the alternator is 8" and a total of 90,000 pounds buoyant change in load. Hence the reason for the 8" wing thickness as previously described.

In another preferred embodiment, built into the operation of a typical wave responsive electrical generator farm is the ability to remotely control the action of each individual wave responsive electrical generator or the entire farm of wave responsive electrical generators in unison utilizing a SCADA system. At various times the wave responsive electrical generator farm may be producing excess power and to compensate several wave responsive electrical generator must be put in "sleep" mode. Other reasons for a "sleep" mode of operation may be (i) The wave responsive electrical generator may have internal issues that are causing a shutdown condition; (ii) The entire farm is at danger from a storm and "sleep" mode is preferred for riding out the storm; (iii) The wave responsive electrical generator is undergoing routine maintenance and service personnel are inside the wave responsive electrical generator working on repairs.

Sleep Mode happens when the wave responsive electrical generator is not connected to the grid and is not producing electrical power. The only features within wave responsive electrical generator that are operational during sleep mode are the bilge pumps (if needed), navigational lighting (for boating safety), internal lights (if service personnel are present) and the IPC. During this mode of operation, these features run off the back-up batteries. Station power consumption is kept to bare minimum. This mode of operation is essential and can only happen for a period of two days or until the wave responsive electrical generator's batteries are depleted of power. The back-up battery system is wired for 24 VDC operation.

During sleep mode the main crank shaft clutch is disengaged causing the main timing belt pulley to freewheel and spin free. The drive weight moves up and down without resistance. The air clutch is designed to be "disengaged" when the air supply is off. Additionally, the air clutch air valve is open to atmosphere when the solenoid is powered down thus assuring that the air clutch is not engaged.

The wave responsive electrical generator employs Emerson's MSS (Machine Solutions Suite with Codesys inside) and Emerson's MCS (Machine Control Studio) to manage every aspect of control and communication inside the wave responsive electrical generator and with the OCC (Onshore Command & Control) center. All Inputs and Outputs within the wave responsive electrical generator are controlled by collectively, "the IPC". The IPC runs in realtime and is connected to the internet via fiber-optic cabling that's embedded within the medium voltage armored cable grid line to shore:

a. The IPC will be 1E-61131 compliant programming tools, which supports the IL, LAD, FB, SFC and ST programming editors. (Microsoft Windows®-based)
    b. Support of IEC-61131 Data types, also Multi-Dimension Arrays, custom data types and Structures.
    c. Highly advanced instruction set and function/function block libraries, which include trigonometric, mathematical, motion, communication, string handling and PLC functions, (e,g. timers and counters).
    d. Support and creation of User Defined Function blocks and Libraries.
    e. Advance programming methods using Object Oriented Programming.
    f. IEC-61131 PC-based runtime.
    g. Tasking Model to support cyclic, freewheeling and event driven tasks.
    h. Cyclic task with deterministic update rates as low as 100 microseconds.
    i. Easy to configuration of network and communication data transfer between field periphery, (I/O, drives, HMI).
    j. Support of different Ethernet network protocols, Modbus TCP/IP, RTMoE, ETherCAT.

k. (Other fieldbus are supported with additional hardware).

l. PC-based runtimes can also be deployed within a multi-core CPU environment, (Microsoft Windows® embedded)

m. Debugging tools n. Watch window for monitoring and forcing I/O values.

o. Trace/scope p. On-line programming.

q. On-line cross referencing.

r. Single stepping and break points s. Integrated HMI visualization.

t. Subroutine capability enables creation of reusable libraries.

u. Runtime Monitoring and Debugging.

v. Integrated online debugging tool.

w. Execution trails provide real-time and historical logic solving information.

x. An integrated OPC server provides the ability to visualize controller runtime data with any OPC capable HMI product.

When the wave responsive electrical generator is in sleep mode, the drive weight moves up and down as the vessel rides up and down on the ocean swells. The timing belts are turning the main crank shaft and main pulley however the primary and secondary transmissions are not moving because the air clutch is disengaged. Conversely the alternator is not turning thus the wave responsive electrical generator is not producing electricity.

Several items to note:

a. The drive weight is always moving vertically, twice as fast as the wave responsive electrical generator hull's vertical velocity.

b. The hull wing is riding swells in the "neutral" buoyancy position as shown below.

c. The water box water level (the wave responsive electrical generator ballast system) has been adjusted so that the neutral buoyancy water line is centered on the 8" thick wing as shown below.

During all modes of operation (Sleep, Pause & Run), the wave responsive electrical generator IPC can be remotely monitored by the "Onshore Command & Control" (OCC) center. Additionally, the OCC center can issue various commands to the SwellGenie™ via internet which is a non-deterministic communication network.

The wave responsive electrical generator IPC has two modes of operation that are mandatory for safe operation. Steeplechase VLC is an operating system and has complete control over the processor's kernel. This control is deterministic to all wave responsive electrical generator I/O and internal operations. Windows 8 operating system runs "on-top" of Steeplechase VLC and is allowed processor time only as a secondary function to it's primary duties of all wave responsive electrical generator IO control. Hence, commands and monitoring requests from the OCC are always secondary requests and they are non-deterministic. At all times, Steeplechase VLC has complete control over the wave responsive electrical generator I/O. In fact the Steeplechase VLC is coded to run the wave responsive electrical generator without communications with the OCC center in the event of internet failure.

Pause Mode is when the wave responsive electrical generator is connected to the grid but is not producing power. During Pause Mode, the wave responsive electrical generator is consuming power from the wave responsive electrical generator Grid to maintain all of the wave responsive electrical generator key system functions. This includes the outputs and inputs as listed in the table above.

The following conditions, events and actions are taking place while the wave responsive electrical generator is in pause mode:

a. The IPC is on and fully functional.

b. The main crank shaft air operated clutch is disengaged causing the main crank shaft to free-wheel.

c. The air compressor is running if the pressure is not at 80 PSI. Cut in operation is under 80 PSI and cutout operation is over 100 PSI.

d. The cooling system pump motor is running if any temperature sensor is over limit.

e. The navigational marker light is turned on.

f. The fog horn is turned on if fog is present and if the wave responsive electrical generator is fitted with the fog detector and fog horn option.

g. The IPC and integral database is monitoring the main crank shaft encoder determining the current state of the ocean swells.

h. The bilge pumps are on if the sump pump limit switches indicate high water in the wave responsive electrical generator pump wells.

i. Ballast level is monitored adding or subtracting air to the water box to maintain a preselected neutral buoyant water line. Any action requiring the addition of air to the ballast system will also trigger the air compressor to operate if it falls below 80 PSI.

It is understood that equivalents and substitutions for elements set forth descriptively above may be obvious to those skilled in the art, and therefore the true scope and definition of the invention is to be as set forth in the following claims.

I claim:

1. A wave responsive electrical generator device comprising:
    an anchor member;
    a buoyant member comprising a rotatable main drive sheave;
    an alternator driven by rotation of said sheave;
    a counterweight member; and
    a line member extending from said anchor member through said buoyant member and to said counterweight member, said line member being received by said main drive sheave and comprising a plurality of belts mounted onto said main drive sheave;
    whereby movement of said line member resulting from up and down movement of said buoyant member relative to said anchor member causes rotation of said main drive sheave and operation of said alternator to produce electricity.

2. The device of claim 1, wherein said main drive sheave and said plurality of belts mechanically interlock.

3. The device of claim 2, wherein said main drive sheave and said plurality of belts comprise transverse ridges.

4. The device of claim 2, wherein said main drive sheave and said plurality of belts comprise transverse grooves.

5. The device of claim 2, wherein said main drive sheave and said plurality of belts comprise teeth.

6. The device of claim 1, wherein said main drive sheave comprises a plurality of sheaves connected so as to operate as a single sheave.

7. The device of claim 1, wherein said main drive sheave comprises a plurality of sheaves formed as a single body.

8. The device of claim 2, wherein said main drive sheave comprises a plurality of sheaves connected so as to operate as a single sheave.

9. The device of claim 2, wherein said main drive sheave comprises a plurality of sheaves formed as a single body.

10. The device of claim 1, further comprising a primary transmission assembly and a secondary transmission assembly, wherein said sheave rotates said primary transmission assembly, said primary transmission assembly rotates said secondary transmission assembly, and said secondary transmission drives said alternator.

11. The device of claim 1, wherein said buoyant member comprises a disk-shaped upper body and a cylindrical lower body, the width of the lower body being less than the width of the upper body.

12. The device of claim 1, further comprising a belt adjustment mechanism mounted on said counterweight.

13. The device of claim 12, wherein said upper body comprises radially extending internal reinforcing members.

14. The device of claim 11, wherein said upper body comprises a peripheral lower angled rim.

15. The device of claim 11, said buoyant member further comprising a descent restrictor member positioned on the underside of said buoyant member.

16. The device of claim 15, wherein said descent restrictor member comprises an apertured frame.

17. The device of claim 1, said counterweight member further comprising a line encircling assembly connecting said counterweight member to said line member between said anchor member and said buoyant member, said line encircling assembly allowing vertical movement of said counterweight along said line member between said anchor member and said buoyant member in response to vertical movement of said buoyant member.

18. The device of claim 17, wherein said line encircling assembly comprises a channeled guide rack.

19. A wave responsive electrical generator device comprising:
   an anchor member;
   a buoyant member comprising a rotatable main drive sheave, a primary transmission assembly, a secondary transmission assembly and an alternator;
   said buoyant member further comprising a disk-shaped upper body and a lower body, the width of the lower body being less than the width of the upper body;
   a counterweight member;
   a line member extending from said anchor member through said buoyant member and to said counterweight member, said line member being received around and mechanically interlocking with said main drive sheave and comprising a plurality of belts mounted onto said main drive sheave, whereby movement of said line member resulting from up and down movement of said buoyant member relative to said anchor member causes rotation of said main drive sheave, said primary transmission assembly, said secondary transmission assembly and said alternator to produce electricity.

* * * * *